United States Patent [19]

Hardwick

[11] 4,378,188

[45] Mar. 29, 1983

[54] COVER ASSEMBLY FOR RECEPTACLE TRANSPORTING VEHICLE

[75] Inventor: Thomas J. Hardwick, DeSoto, Kans.

[73] Assignee: Haulmasters, Inc., Kansas City, Mo.

[21] Appl. No.: 193,826

[22] Filed: Oct. 3, 1980

[51] Int. Cl.[3] .............................................. B65G 65/04

[52] U.S. Cl. ............................. 414/411; 298/23 MD; 298/23 C; 414/414; 414/421

[58] Field of Search ....................... 414/411, 421, 414; 298/23 R, 23 C, 23 MD

[56] References Cited

U.S. PATENT DOCUMENTS 3,913,969 10/1975 Hoch ................................ 298/23 R 4,063,658 12/1977 Kress .................................. 414/421

FOREIGN PATENT DOCUMENTS 1282495 3/1961 France ............................... 414/411

*Primary Examiner*—Richard A. Schacher

*Attorney, Agent, or Firm*—Litman, Day and McMahon

[57] ABSTRACT

A cover assembly is provided which is adapted for use on a receptacle transporting vehicle having a receptacle supporting scull frame swingable from a receptacle transport position to a dumping position for discharging molten contents of the receptacle. Included in the assembly is an insulated lid member for opening and closing the receptacle, the closure position retarding heat loss from the molten contents to preclude solidification during transport thereof between spaced locations. A pair of laterally spaced-apart support arms, mounted so as to move concurrently with the swingable scull frame, position the lid member adjacent the top of the receptacle during scull frame movement and especially during transport of the receptacle from one location to another. A pivot assembly rotates the support arms for similar movement of the attached lid between receptacle opening and closure positions, such movement being independent of the scull frame movement. An operator-actuated piston system selectively controls lid movement between the opening and closure position. The assembly is mounted to the scull frame to provide rotation of the lid in a direction away from and contra the rotational movement of the scull frame from the transport to dumping positions to preclude interference of the lid with the contents being discharged from the receptacle.

13 Claims, 7 Drawing Figures

COVER ASSEMBLY FOR RECEPTACLE TRANSPORTING VEHICLE

BACKGROUND OF THE INVENTION

This invention relates to a receptacle transporting vehicle and more particularly to a cover assembly having an operator-controlled lid for selective closure of the supported receptacle during transport and opening of the same prior to dumping of the contents carried therein.

The specialized hauling equipment industry includes a transport vehicle for carrying an extremely heavy open-top receptacle, such as a slag pot containing molten metals therein. One embodiment of such a vehicle is set forth in U.S. Pat. No. 4,105,310, issued Aug. 8, 1978, which patent is hereby incorporated herein.

The reference vehicle, referred to as a slag pot carrier, allows a receptacle, loaded with an extremely heavy load of molten metals and especially slag, including rock and other contaminents found in ore or the like from which the metal is separated in conventional processes, to be engaged by the vehicle in a carrying position for subsequent transport to a discharge area such as a slag pile. Upon arrival, a swingable dumping frame assembly cooperates with a scull frame assembly to move the supported receptacle from a transport position to a tilted position for discharge of the receptacle contents.

The present invention addresses the need to close the open-top receptacle during transport and to open this receptacle prior to discharge of the carried contents. This receptacle closure prevents foreign particles from entering the receptacle during transport as well as precludes the contents from splashing therefrom. More importantly, the cover assembly encloses the receptacle in a generally air-tight manner so as to reduce convection heat loss from the receptacle and thereby substantially maintain the temperature of the carried contents in order to decrease the rate of solidification thereof. Previously, this tendency towards solidification, due to the unrestrained cooling of the contained materials, inhibited the flow of the contents from the tilted receptacle during discharge and increased the formation of caked material or "sculls" therein.

Accordingly, a cover assembly associated with the vehicle and operable in conjunction with the movement of the receptacle is desired to allow the operator to selectively open and close the transported receptacle. As it is desired in some instances to move the receptacle from its transport position to a tilted position without dumping the contents therefrom, the cover assembly movement must respond to the receptacle movement and have a lid independently operable during such responsive movement. Thus, known covers of a gravitational type are not suitable but rather a cover assembly incorporating a lid member selectively movable between a receptacle closure position and an open position thereof is desired. It is also noted that the slag hauling receptacle is not readily adaptable to inclusion of a lid therewith and therefore a lid associated with the support frame is desirable.

The present invention provides a cover assembly mounted on the receptacle transport vehicle for movement with the supported receptacle from a transport position to a dumping position. The cover assembly includes a lid member for receptacle closure and is movable, preferably by selective operator control, between the closure position and the open position thereof. Movement of the lid member towards the open position is in a direction away from the flow path of the discharged contents so as to preclude interference therewith.

OBJECTS OF THE INVENTION

It is therefore a general object of the present invention to provide a cover assembly for a receptacle, which receptacle is adapted for transport so as to contain contents of a molten character therein.

Another general object of this invention is to provide a cover assembly, as aforesaid, particularly adapted for use with a receptacle transporting vehicle.

A further object of this invention is to provide a cover assembly, as aforesaid, which is responsive to receptacle movement from a transport position to a dumping position.

Still another object of this invention is to provide a cover assembly, as foresaid, having a lid member for the provision of receptacle closure which is operator-controlled so as to be selectively movable between closure and open positions.

A still further object of this invention is to provide a cover assembly having a lid member therein, as aforesaid, where the lid is movable in a direction away from a dumping flow path of the contents from the receptacle.

A particular object of this invention is to provide a cover assembly with lid member, as aforesaid, which is constructed so as to retard the cooling of the materials contained within the receptacle.

A further particular object of this invention is to provide a cover assembly with lid member, as aforesaid, which generally prevents sticking of the lid member to the receptacle.

Another object of this invention is to provide a cover assembly, as aforesaid, which is durable in construction, positive in operation, and particularly well adapted for the proposed useage thereof.

Other objects and advantages of this invention will become apparent from the following description taken in connection with the accompanying drawings, wherein are set forth by way of illustration and example certain embodiments of the present invention.

DETAILED DESCRIPTION OF THE PREFERRED EMBODIMENT

Figure 1:
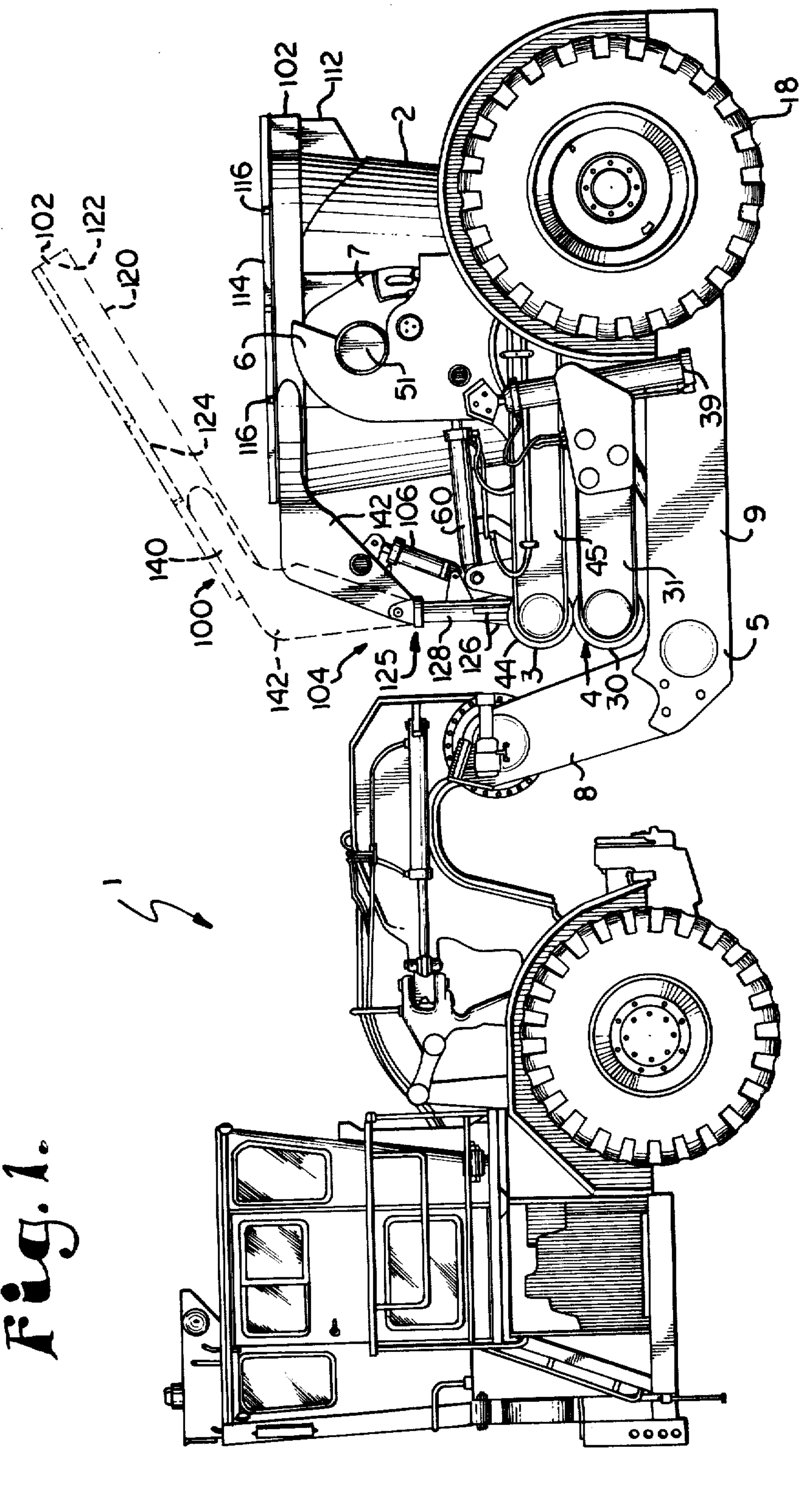
FIG. 1 is a side elevation view of a receptacle transporting vehicle in a transport position with a cover assembly mounted thereto and a lid member in a receptacle closure position, an open position of the cover assembly being shown in phantom.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The cover assembly 100 is set forth in reference to a receptacle transporting vehicle as shown in U.S. Pat. No. 4,105,130 issued Aug. 8, 1978 which is hereby incorporated into this specification. A brief discussion, for the convenience of the reader, is subsequently set forth with numerical correspondence between the specifications maintained.

Accordingly, a receptacle transporting vehicle 1 has been adapted to carry an open receptacle 2, such as a slag pot or the like for transport to a location for discharging the contents of the receptacle 2 therefrom. The vehicle 1 is capable of moving the rim of the receptacle 2 into and out of engagement with a ground surface to remove sculls or caked material therefrom. The receptacle transporting vehicle 1 is particularly adapted for heavy loads and the contents, at times semi-molten in character, which may weigh 400,000 to 500,000 pounds.

The receptacle transporting vehicle 1 includes an upper or scull frame 3 adapted to retain and support the receptacle 2 thereon and a dumping frame 4 positioned between the scull frame 3 and a mobile main or carrier frame 5. The scull frame 3 and dumping frame 4 are each pivotally mounted on the main frame 5 and employ extensible members to effect movement of the scull frame 3 and dumping frame 4 relative to the main frame 5 for movement of the receptacle 2 to a discharge position. The scull frame 3 has hook portions 6 and movable keeper members 7 each engageable with respective trunnion 51 portions of the receptacle 2 for retaining the receptacle 2 in supported engagement during transportation and the discharging of the contents thereof.

The main carrier frame 5 is a generally U-shaped structure including a forward end portion 8 and a pair of laterally spaced apart sidearms including sidearm 9 extending rearwardly from the forward end portion 8 and parallel to the longitudinal central axis of the main frame 5. The mobile main frame 5 has one or more surface engaging wheels 18 mounted on each of the sidearms (sidearm 9 shown) respectively. The dumping frame 4 is also a generally U-shaped structure including a forward end portion 30 and a pair of laterally spaced-apart sidearms 31 and 32 extending rearwardly from the forward end portion 30 and parallel to the longitudinal central axis of the dumping frame 4. The rear end portions of the sidearms 31 and 32 are pivotally mounted on the rear end portions of the sidearms (sidearm 9 shown) of the main frame 5.

Extensible members, such as member 28, bridging the forward end portion 8 of the main frame 5 and side members, such as member 31, of the dumping frame 4 raise and lower the dumping frame 4 relative to the main frame 5. The extensible members, 28 shown, are preferably two-stage hydraulic cylinders with one of the stages preferably double-acting. Actuation of the extensible members (member 28 shown) preferably moves the dumping frame 4, scull frame 3 and the receptacle 2 with contents therein through an arc of at least 75 degrees.

The sidearms of the dumping frame 4 have extensible members, such as shown member 39, pivotally mounted thereon and move the scull frame 3 relative to the dumping frame 4 between a first position for carrying the receptacle 2 and contents therein and a second position for discharging contents of the receptacle 2. The upper end of each extensible member, member 39 being shown, is pivotally mounted to the hook portion 6.

Actuation of the extensible members, member 39 being shown, moves the scull frame 3 relative to the dumping frame 4 after the extensible members have moved the frames 3 and 4 from the transport position. The extensible members, member 39 being shown, operate to move the scull frame 3 through an arc of approximately 45 degrees so that the total movement of the scull frame 3 is through an arc of approximately 120 degrees.

The scull frame 3 is a generally U-shaped structure including a forward end portion 44 and a pair of laterally spaced-apart sidearm members 45 and 46 extending rearwardly from the forward end portion 44 and parallel to a longitudinal central axis of the scull frame 3. The side members 45 and 46 of the scull frame 3 have rear end portions (portion 47 shown) pivotally mounted by pins or bearing members to the rear end portions of the sidearms (sidearm 9 being shown) of the main frame 5.

The scull frame sidearms 45 and 46 each have extensible members 60 and 61 associated therewith. Each extensible member 60 and 61 has one end pivotally connected to an ear of the respective keeper member 7 and is operative to move the keeper member 7 between first and second positions.

Figure 4:
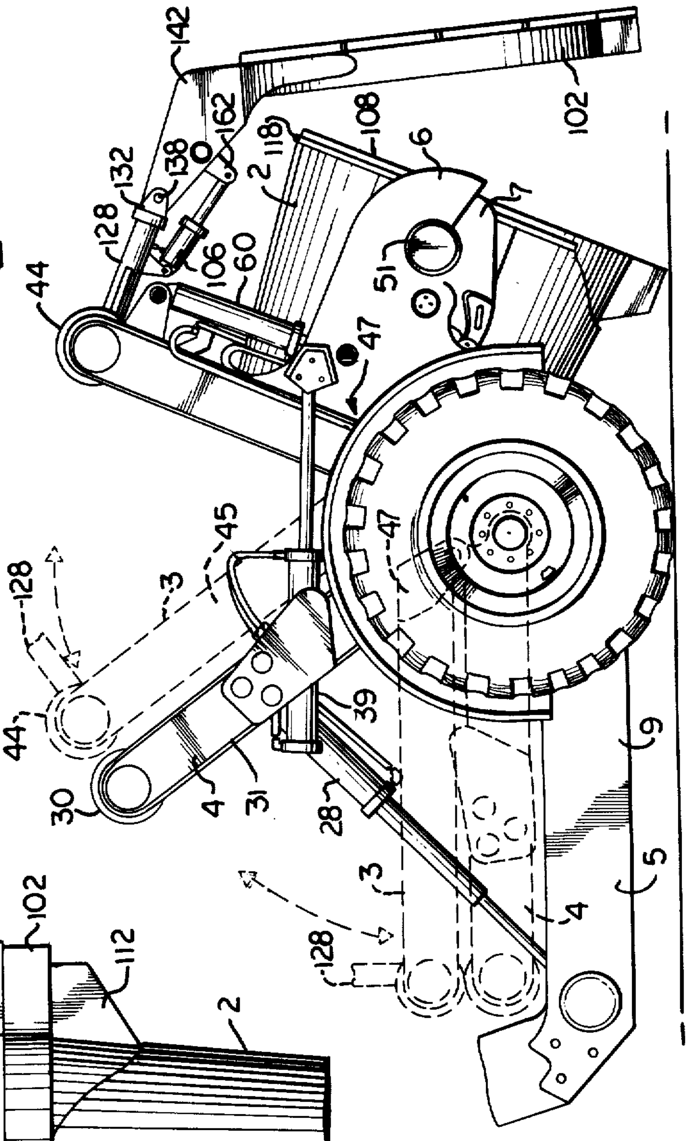
FIG. 4 is a fragmentary side elevation view, showing movement in phantom of a dumping frame and the scull frame from a receptacle transport position to a receptacle dumping position with the cover assembly being shown in an open position thereof in conjunction with the receptacle in a dumping position thereof.

Prior to discharge of the contents of the receptacle 2, the vehicle 1 is positioned in the desired location and extensible members, such as shown member 28, are operated to raise the dumping frame 4, scull frame 3 and receptacle 2 with contents therein, see steps of raising receptacle 2 in FIG. 4. The extensible members extending between the main frame 5 and the dumping frame 4 move the dumping frame 4 through an arc of approximately 75 degrees. Extensible members, such as member 39, mounted on the dumping frame 4 then move the scull frame and receptacle 2 thereon through an angle of approximately 45 degrees, with accompanying tilting of the receptacle 2, so that the total angular movement of the scull frame 3 is through an arc of approximately 120 degrees. After the contents of the receptacle 2 have been discharged, a rim 108 of the receptacle 2 may be repeatedly moved into and out of engagement with the ground or support surface to jar or vibrate sculls or caked material from the interior of the receptacle 2. After discharge the extensible members, such as member 39, are retracted to return the scull frame 3 into engagement with the dumping frame 4. Extensible members are retracted through two stages with the latter stage of the extensible members retracted by the weight of the frames 4 and 5 and the empty receptacle 2, so as to move the receptacle 2 to the transport position.

Figure 5:
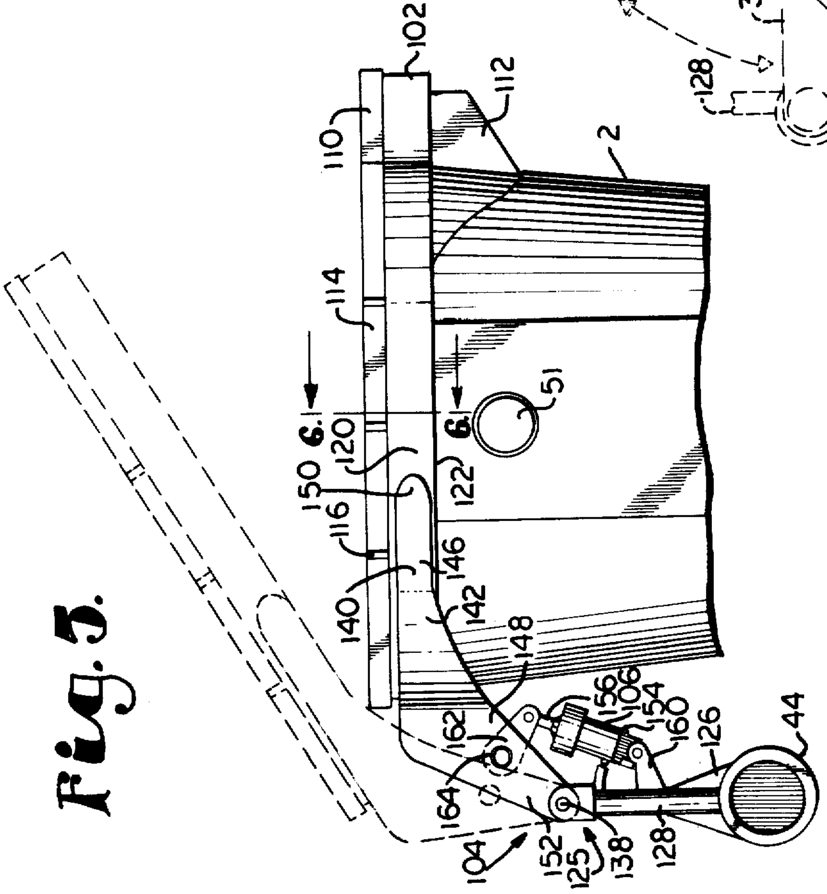
FIG. 5 is a fragmentary side elevation view, on an enlarged scale, showing the receptacle closure position of the lid member and in phantom an open position thereof.

The cover assembly 100 is mounted to the forward end portion 44 of the scull frame 3 for concurrent movement therewith, as shown in FIG. 4, and generally comprises a lid member 102, a lid support assembly 104, a pivot assembly 125, and an extensible member 106 for moving the lid member 102 between open and closed positions relative to the supported receptacle 2 as shown in FIG. 5.

Figure 2:
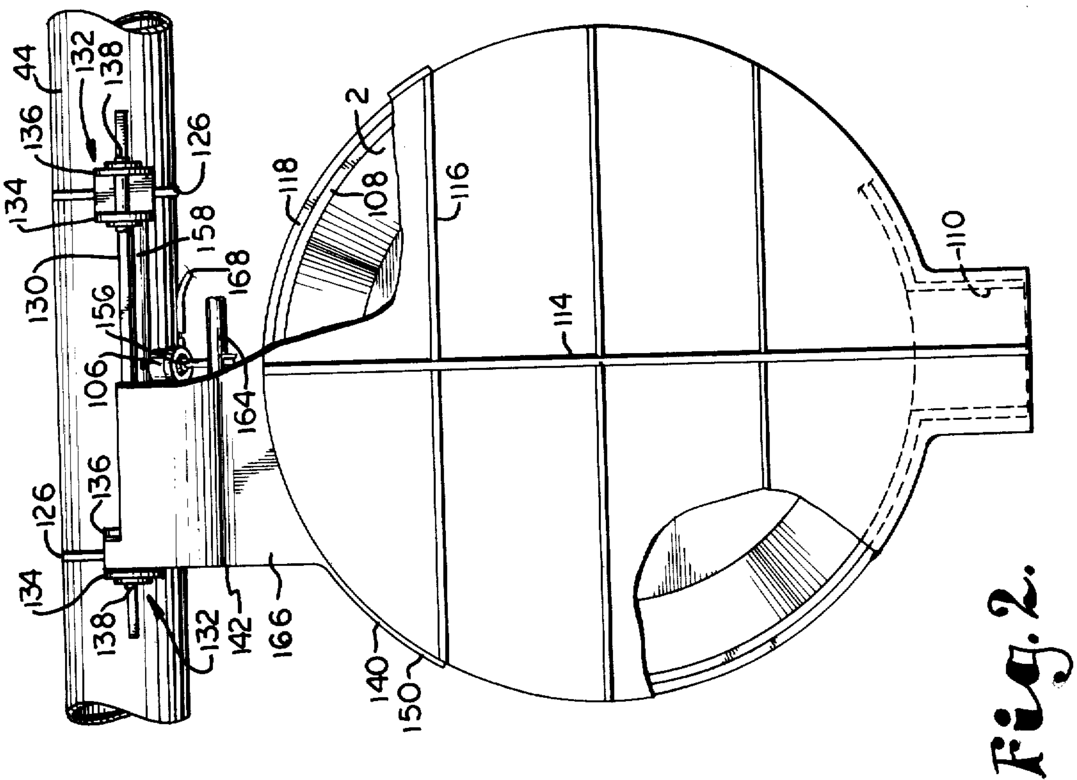
FIG. 2 is a fragmentary top plan view of the cover assembly, on an enlarged scale, showing the lid member in the closure position with portions thereof broken away to show the underlying receptacle and means for mounting the cover assembly to a scull frame of the vehicle.
Figure 7:
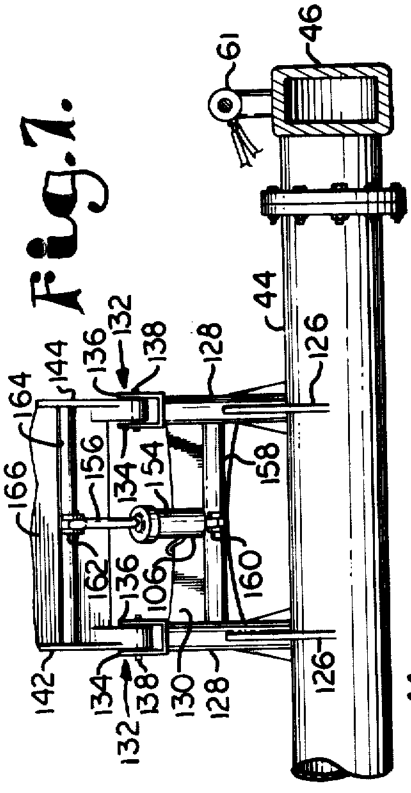
FIG. 7 is a sectional elevation view taken along line 7—7 in FIG. 3 showing the means of mounting the cover assembly to the scull frame of the receptacle transport vehicle.

The lid member 102 is of a configuration complementing the perimeter of the free rim 108 of the receptacle 2 proper and, as shown in FIG. 2, is generally circular in configuration with an extension 110 corresponding to a spout 112 located on the front of the receptacle 2. The exterior surface of the lid 102 has thereon a longitudinally extending support flange 114 with a plurality of spaced-apart support ribs 116 transversely extending therefrom. The lid member 102 may be insulated if so desired.

Figure 6:
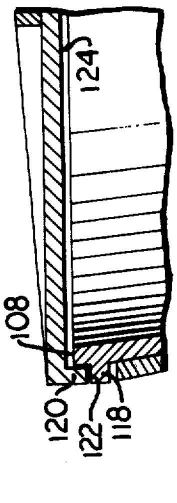
FIG. 6 is a fragmentary sectional elevational view, taken along line 6—6 in FIG. 5 showing the relationship of a depending wall of the lid member to the top of the receptacle.

An annular shelf 118 extends about and slightly below the rim 108 of the receptacle 2 as shown in FIG. 6. The shelf 118 acts as a limit plate for engaging a free edge 122 of a depending side wall 120 of the lid 102 upon movement of the lid member 102 beyond a normal closure position. The shelf 118, upon free edge 122 engagement, supports the underside of the lid 124 in a vertically spaced-apart relationship, relative to the receptacle rim 108, to preclude contiguity between the opposed surfaces and unwanted interference or possible sticking therebetween.

Included in the lid support assembly 104 is a pair of laterally spaced-apart sidearms 142 and 144, each generally doglegged in configuration to present an integral horizontal leg portion 146 and a downwardly depending vertical leg portion 148. The rearward portion 150 of each horizontal leg 146 traces the configuration of a portion of the side wall 120 of the lid member 102 and presents a collar 140. The collar 140 is designed to receive a portion of the lid 102 therein for supporting the lid member 102 at a position adjacent the top of the receptacle 2 during scull frame 3 movement. Furthermore, movement of the sidearms 142 and 144, as provided by the pivot assembly 125, results in concurrent movement of the attached lid 102. A reinforcing wall 166 spans the spaced-apart sidearm 142 and 144 to offer rigidity thereto.

The pivot assembly 125 presents rotatable movement to the lid 102 and includes first and second columnar members 128 extending from laterally spaced-apart mounting brackets 126 which are in turn connected to the forward end portion 4 of the scull frame 3. These members 128 extend away from the forward portion 44 of the scull frame 3 and in a generally upright direction when the scull frame 3 is at a normal transport position as shown in FIG. 1. A backing plate 130 spans the spaced-apart mounting brackets 126 to provide extra reinforcement thereto. The upper end of each columnar member 128 is of a clevis-type configuration 132 presenting first and second laterally-spaced side walls 134 and 136 with an aperture therein to receive a pivot pin 138 therethrough, as seen in FIG. 2.

Apertures in a lower end 152 of each vertically depending leg portion 148 are aligned with apertures of the clevis side walls 134 and 136 to allow for insertion of the pivot pin 138 therethrough. Upon insertion swingable movement is presented to the sidearms 142 and 144 about a common and generally horizontal axis as defined by the respective pivot pins 138. The assembly 125, as above described and as shown in FIG. 5, provides rotatable movement to the lid 102 about the common horizontal axis, independent of the scull frame 3 movement, such that the lid member 102 may be selectively moved from a receptacle closure position, as shown by solid lines in FIG. 5, to an open position, as shown by phantom lines in FIG. 5, displaced from the top of the receptacle 2. The common axis, as defined by the pivot pins 138, has been positioned forward of the receptacle 2, relative to the vehicle 1 proper so as to allow lid 102 movement without interference with the receptacle 2 proper and the contents flowing therefrom, as shown in FIG. 4.

Figure 3:
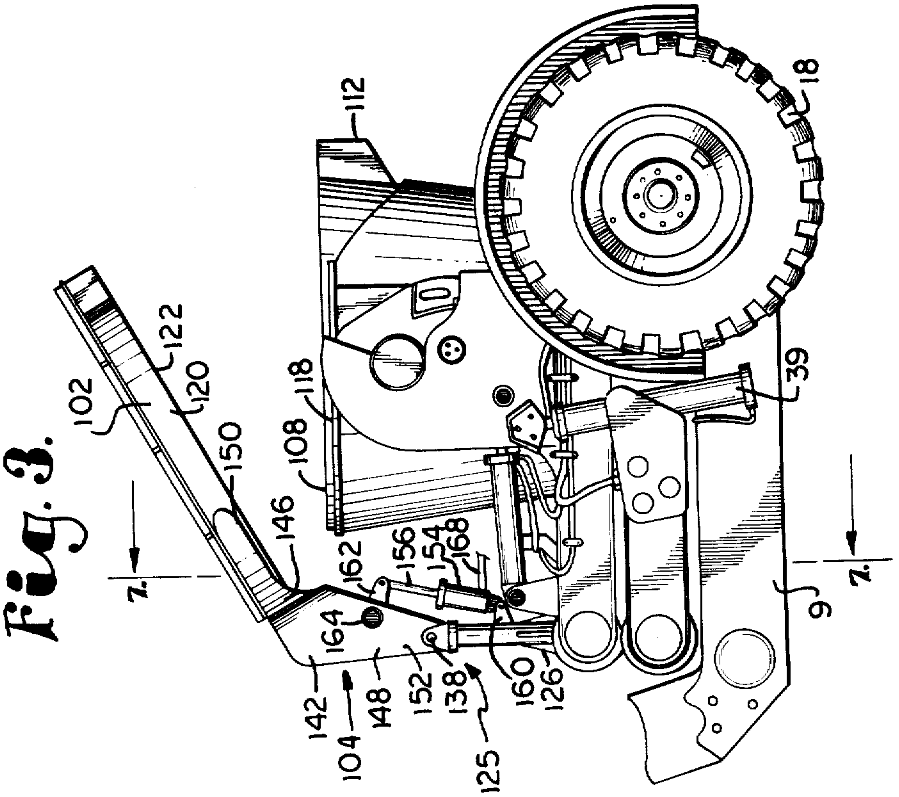
FIG. 3 is a fragmentary side elevation view showing the lid member of the cover assembly in an open position.

The extensible member 106 serves to control the lid 102 movement and, as is shown, is an operator-actuated hydraulic piston comprising a cylinder 154 with an actuable piston rod/ramrod 156 therein. An extensible member support bar 138 is mounted to the forward end portion 44 of the scull frame 3 so as to be attached to and extending between the columnar support members 128 and includes a projecting basal support arm 160 at the upper end thereof extending towards the receptacle 2. The extensible member 106 is pivotally mounted at the lower end thereof to the arm 160. One end of a lever arm 162 is normally joined to a transverse connecting rod 164, functioning as a crank rod spanning the sidearms 142 and 144. The other end of the lever arm 162 is connected to the ramrod 156 of the extensible member 196. Upon introduction of the hydraulic fluid into the cylinder 154, via line 168, the ramrod 156 seeks full extension causing lever arm 162 to drive against the transverse rod 164. The interaction of the lever arm 162 and rod 164 provides for transmission of the elongation of ramrod 156 to the arms 142 and 144 for pivotal movement about their respective pivot pins 138. This pivotable movement of the side arms 142 and 144 provides concurrent movement of the collared lid member 102 to an open position, as is shown in FIG. 3. Evacuation of the fluid from the cylinder 154 causes a return of the ramrod 156 of the extensible member 106 to a normal withdrawn position and a reversal of the above-described extensible member 106 action for lid 102 movement to a closure position, as is shown in FIG. 1.

Although the cover assembly 100 has been described with reference to a specific receptacle transporting vehicle, it is understood that the assembly 100 is adaptable for use with similar vehicles having a swingable frame for moving a supported receptacle to a dumping position for discharge of the contents therefrom.

It is understood that, although a certain embodiment of the present invention has been described and illustrated herein, the invention is not to be limited to the specific details described and shown.

What is claimed and desired to be secured by Letters Patent is:

1. In combination:

(a) an open top receptacle;

(b) a mobile main frame having a supporting frame assembly for said receptacle associated therewith; said receptacle being removable from said frame; said receptacle supporting frame assembly being swingable through a vertically disposed arc relative to the mobile main frame so as to rotate said receptacle from a transport position to a dumping position for discharging contents of the receptacle; and (c) a cover assembly attached to said supporting frame independent of the receptacle comprising:

(1) a lid member for selectively closing the top of said receptacle;

(2) support means mounted on said supporting frame for positioning said lid adjacent the top of said receptacle during said supporting frame movement;

(3) pivot means for presenting rotatable movement to said lid, independent of said supporting frame movement, from a receptacle closure position to an open position displaced from the top of said receptacle; and (4) drive means for controlling said rotatable movement of said lid whereby said lid is selectively rotatable between said closure and open positions.

2. The combination according to claim 1, wherein said drive means comprises:

(a) an extensible member variously elongate between normal and fully extended positions;

(b) means for connecting said extensible member to said swingable frame for concurrent movement therewith;

(c) regulator means for adjusting said extensible member elongation between said normal and fully extended positions; and (d) link means interposed between said extensible member and said lid member for transmitting said elongation of said extensible member to said lid member, said transmission providing a degree of rotation to said lid corresponding to the degree of elongation of said extensible member.

3. The combination according to claim 2, wherein said link means comprises:

(a) a lever arm having first and second ends;

(b) means connecting said first end to said extensible member; and (c) crank means connected to said second end of said lever arm and joined to said pivot means for transmitting motion of said lever arm thereto whereby said pivot means is responsive to said elongation of said extensible member for ultimate swingable movement of said lid.

4. The combination according to claims 2 or 3, wherein:

(a) said extensible member comprises a hydraulic piston reciprocally responsive to fluid pressure introduced therein, said piston including a piston rod having a free end connected to said link means whereby said pivot means is responsive to movement of said reciprocal piston for rotation of said lid between said open and closure position.

5. The combination according to claim 1, wherein said support means comprises:

(a) at least one elongated support arm having first and second ends with said first end of each support arm combined with said pivot means to provide for rotation of each arm about a common horizontal axis relative to said swingable frame; and (b) means for connecting said lid member to said second end of said arm whereby said arm rotation provides for said independent rotatable movement of said lid.

6. The combination according to claim 5, wherein said pivot means comprises:

(a) a bracket associated with each support arm and having a clevis-type member for receiving said first end of each support arm therein; and (b) a pivot pin defining said horizontal axis and disposed through said associated clevis member and support arm received therein whereby each support arm is pivotable about said pivot pin.

7. In combination:

(A) an open top receptacle;

(B) a mobile main frame having a supporting frame assembly for said receptacle associated therewith; said receptacle supporting frame assembly being swingable through a vertically disposed arc relative to the mobile main frame so as to rotate said receptacle from a transport position to a dumping position for discharging contents of the receptacle; and (C) a cover assembly associated with said receptacle comprising:

(1) a lid member for selectively closing the top of said receptacle;

(2) support means mounted on said supporting frame assembly for positioning said lid adjacent the top of said receptacle during said swingable frame movement; said support means comprising:

(i) at least one elongated support arm having first and second ends with said first end of each support arm combined with said supporting frame assembly to provide for rotation of each arm about a common horizontal axis relative to said supporting frame assembly; and (ii) means for connecting said lid member to said second end of said arm whereby rotation of said arm provides for said independent rotatable movement of said lid; said connecting means comprising:

(a) a collar member having a configuration corresponding to a portion of the perimeter of said lid member;

(b) means for combining said collar member to said second end of said support arm; and (c) means for retaining said lid member portion in said collar whereby said collar is concurrently rotatable with said support arm to provide for said swingable movement to said lid;

(3) pivot means for presenting rotatable movement to said lid, independent of said supporting frame assembly movement, from a receptacle closure position to an open position displaced from the top of said receptacle; and (4) drive means for controlling said rotatable movement of said lid whereby said lid is selectively rotatable between said closure and open positions.

8. The combination according to claim 1, wherein:

(a) said receptable has a shelf extending about the perimeter thereof, said shelf displaced from the top of an upper rim of said receptacle, for engagement of depending portions of said closed lid member whereby to prevent interference between the underside of said lid member and the top of said receptacle.

9. The combination according to claim 1, wherein (a) said lid movement from said closure position to said open position is contra the direction of said swingable frame movement to preclude interference of said lid member with the dumping of said receptacle contents.

10. A receptacle transporting vehicle comprising:

(a) an open top receptacle;

(b) a mobile main frame;

(c) a dumping frame mounted for first pivotal movement with respect to said main frame;

(d) first extensible means between said main frame and said dumping frame for effecting said first pivotal movement;

(e) a scull frame having means thereon for supporting said receptacle during transport, said scull frame mounted for second pivotal movement relative to said dumping frame;

(f) second extensible means between said scull frame and said dumping frame for effecting said second pivotal movement therebetween, said first and second pivotal movements presenting a range of positions to said receptacle from a normal transport through a vertically disposed arc to a dumping position for dumping the contents of said receptacle;

(g) a lid member for selectively closing the top of said receptacle;

(h) support means mounted to said scull frame for positioning said lid adjacent the top of said receptacle during said scull frame movement;

(i) pivot means for presenting rotatable movement to said lid, independent of said scull frame movement, from a receptacle closure position to an open position displaced from the top of said receptacle; and (j) drive means movable with said scull frame for controlling said rotatable movement of said lid whereby said lid is selectively rotatable between said closure and open positions.

11. In a receptacle transporting vehicle adapted to selectively engage and retain a removable and open top receptacle for transporting and discharging material retained therein, the vehicle including a pivotal frame adapted to rotate said receptacle between a material transporting position and a material discharging position, the improvement comprising:

(a) a lid member independent from said receptacle and mounted on said frame; said lid member being selectively positionable for covering relationship relative to said receptacle; and (b) drive means mounted on said frame and engageable with said lid member for selectively urging said lid member between a first position wherein said receptacle is covered and a second position wherein said lid is displaced from said receptacle allowing discharge of said material.

12. The vehicle according to claim 11 wherein:

(a) said support means pivotally connects said lid member to said frame structure.

13. The vehicle according to claim 12 wherein:

(a) said frame structure is a subframe of a main frame;

(b) said subframe being rotatable relative to said main frame so as to allow for rotation of said receptacle between a transport position and a dumping position thereof; and (c) motor means for selectively rotating said subframe relative to said main frame and being independent of said drive means, such that said lid may be moved between said open position and said closure position thereof independent of rotation of said subframe relative to said main frame.

* * * * *